US007539351B2

(12) United States Patent
Xu et al.

(10) Patent No.: US 7,539,351 B2
(45) Date of Patent: May 26, 2009

(54) MODEL-BASED LINE WIDTH CONTROL

(75) Inventors: Beilei Xu, Penfield, NY (US); Robert P. Loce, Webster, NY (US); Stuart A. Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 772 days.

(21) Appl. No.: 11/156,431

(22) Filed: Jun. 20, 2005

(65) Prior Publication Data

US 2006/0285764 A1    Dec. 21, 2006

(51) Int. Cl.
G06K 9/36    (2006.01)
(52) U.S. Cl. .................................................. 382/256
(58) Field of Classification Search .............. 382/256, 382/257, 258, 259
See application file for complete search history.

(56) References Cited

U.S. PATENT DOCUMENTS 5,261,012 A *  11/1993  Hardy et al. .................. 382/55
6,282,327 B1 *  8/2001  Betrisey et al. .............. 382/299
6,429,951 B1 *  8/2002  Kiuchi et al. ................. 358/1.9
6,678,414 B1     1/2004  Loce et al. .................... 382/209
2001/0038712 A1  11/2001  Loce et al. .................... 372/190
2005/0238248 A1 * 10/2005  Mitsutani et al. ............. 382/257

OTHER PUBLICATIONS

Gaskill, Jack D., "Linear Systems, Fourier Transforms, and Optics," copyright 1978, pp. 43 and 44, John Wiley & Sons, New York.

* cited by examiner

Primary Examiner—Andrew W Johns
(74) Attorney, Agent, or Firm—Fay Sharpe LLP

(57) ABSTRACT

Image object adjustment is achieved without lookup tables or templates. Cross sections of image objects are modeled. Parameters of the modeled cross-section are adjusted in accord with a desired effect. For example, a width of the modeled cross section is change. The changed cross section model is sampled to determine a new value for a target pixel. For instance, vector windows are applied to a target pixel. If a candidate image object is included in the vector window, a cross section thereof is modeled as a rectangle. A parameter of the model, such as a width, is adjusted. Area sampling of the adjusted model can be used to determine a new value for the target pixel. Accuracy can be increased by blending information associated with a plurality of vector windows.

28 Claims, 9 Drawing Sheets

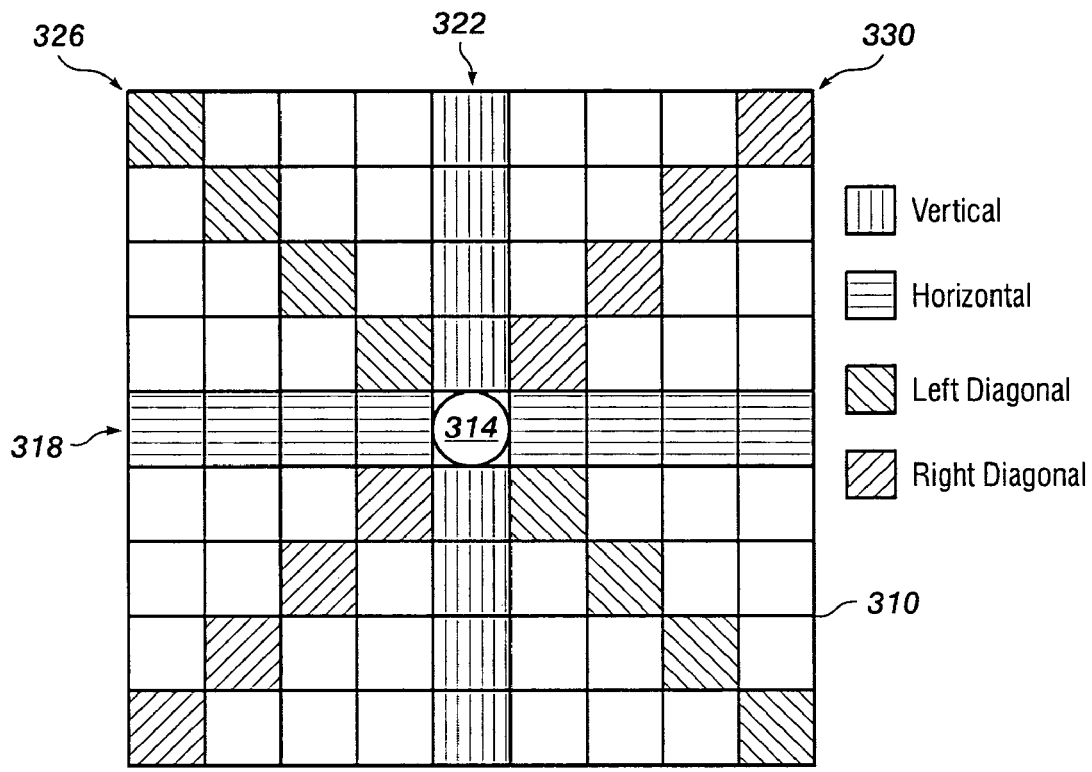
FIG. 3
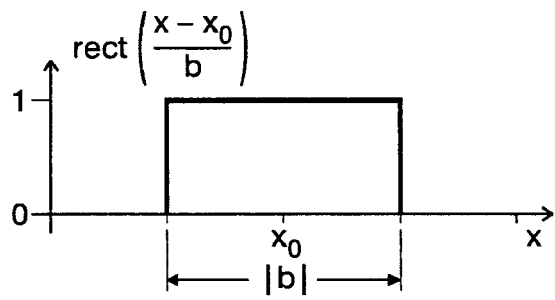
FIG. 4A
$$410 \quad \text{rect}\left(\frac{x-x_0}{b}\right) = \begin{cases} 0, & \left|\frac{x-x_0}{b}\right| > 1/2 \\ 1/2, & \left|\frac{x-x_0}{b}\right| = 1/2 \\ 1, & \left|\frac{x-x_0}{b}\right| < 1/2 \end{cases}$$
FIG. 4B

MODEL-BASED LINE WIDTH CONTROL

BACKGROUND

Aspects of the present disclosure and embodiments thereof include methods and systems for adjusting aspects of images. For example, the methods and systems may be employed to control line width in image objects, such as, for example, text and line art. Embodiments will be described with reference to line width adjustment. However, embodiments may be applied to the adjustment of other aspects of image objects.

It should be noted that the term line, or lines, is meant to refer herein to any relatively thin image object, including, but not limited to, curves and circles.

Many images include thin lines. For example, the characters of text are considered to be made up of thin lines and curves. Additionally, many business forms include lines and grids for separating portions of a document. Many drawings are made up of discreet thin lines. It is desirable to be able to adjust images in order enhance or improve their appearance. For instance, it may be desirable to adjust the thickness of lines in an image.

For example, one way to adjust the darkness or lightness or enhance the contrast of a document being printed or photocopied is to adjust the thickness of lines. Additionally, it may be desirable to adjust the thickness of lines in an image in order to compensate for a drift or imperfection in an image rendering system. For instance, an ink or toner may spread or be absorbed by a print media more or less readily than anticipated. If an ink spreads more readily than an ideal or anticipated amount, then, for example, a white line or feature printed on a black, gray or colored background, might appear thinner than desired or may be completely filled in by spreading colorant from neighboring portions of an image. If an ink or toner or other colorant spreads less readily than anticipated, then a black, gray or colored line may appear thinner than desired. By adjusting a digital representation of the image or selected image objects of the image to be larger or thicker than originally called for, it is possible to compensate for such variations in colorant and print media behavior.

U.S. Patent Application Publication US2001/0038712 A1 to Loce, et al. published Nov. 8, 2001, entitled LOOSE GRAY SCALE TEMPLATE MATCHING FOR IMAGE PROCESSING OF ANTI-ALLI[A]SED [LINES], discusses methods for controlling the width of lines in association with loose-template matching. U.S. Pat. No. 6,678,414 B1 to Loce, et al., which issued Jan. 13, 2004, also discusses line width control in the context of template matching. The disclosures of these documents are totally incorporated herein by reference.

Template matching techniques require a relatively large amount of system memory and/or data storage resources. Furthermore, template matching techniques require that a relatively large number of data lookup and comparison procedures be performed.

Also, template matching techniques typically operate on image structures of a very specific size, shape, and orientation. Hence, the templates designed for one application tend to be useless for another related application, and a complete redesign of templates is required even if the problems are quite similar. For example, templates designed to modify the width of thin lines are likely to be useless for modifying the width of slightly wider lines. Hence, a significant redesign effort can be required for small variations of an application.

There has been a desire for line width control techniques with reduced system storage requirements. Additionally, there has been a desire for line width control techniques that do not require, or require fewer, data lookups and comparisons. Further, there is a desire for line width control methods that can be efficiently adapted to related applications, thereby greatly reducing the design effort.

BRIEF DESCRIPTION

A method for adjusting an image that includes text or a line can include identifying line portions associated with text or a line of the image, modeling one-dimensional density distributions of the identified line portions as rectangles, determining distribution parameters of the one-dimensional models, adjusting at least one distribution parameter of the one-dimensional models according a desired effect, area sampling the models of the rectangles based on the adjusted distribution parameters, and adjusting pixel values of the image according to the area sampling.

For instance, a illustrative method for controlling a width of one or more image objects can include, for each pixel in at least a portion of an image, selecting the pixel as a target pixel and determining if the target pixel is associated with an image object that is a candidate for width control. If the target pixel is associated with an image object that is a candidate for width control, determining at least one original width of the image object, determining at least one centroid of the image object, determining at least one width change for the image object based on the at least one original width, and determining a new value for the target pixel based on at least one of the determined at least one width change and a position of the target pixel relative to the determined at least one centroid.

An illustrative system that is operative to adjust an image that includes text or a line can include a line portion identifier that is operative to identify portions of an image that are associated with text or a line, a line width modeler that is operative to model one-dimensional density distributions of the identified line portions as rectangles and determine distribution parameters of the one-dimensional models, and a line width adjuster that is operative to adjust at least one distribution parameter of the one-dimensional models according to original values of the distribution parameters and a desired effect, area sample the models based on the adjusted distribution parameters and adjust pixel values of the image according to the area sampling.

BRIEF DESCRIPTION OF THE DRAWINGS

FIG. 3 illustrates various windows that can be used in conjunction with the methods of FIG. 1 and/or FIG. 2.

FIG. 4A and FIG. 4B illustrate aspects of a rect( ) function.

DETAILED DESCRIPTION

Figure 1:
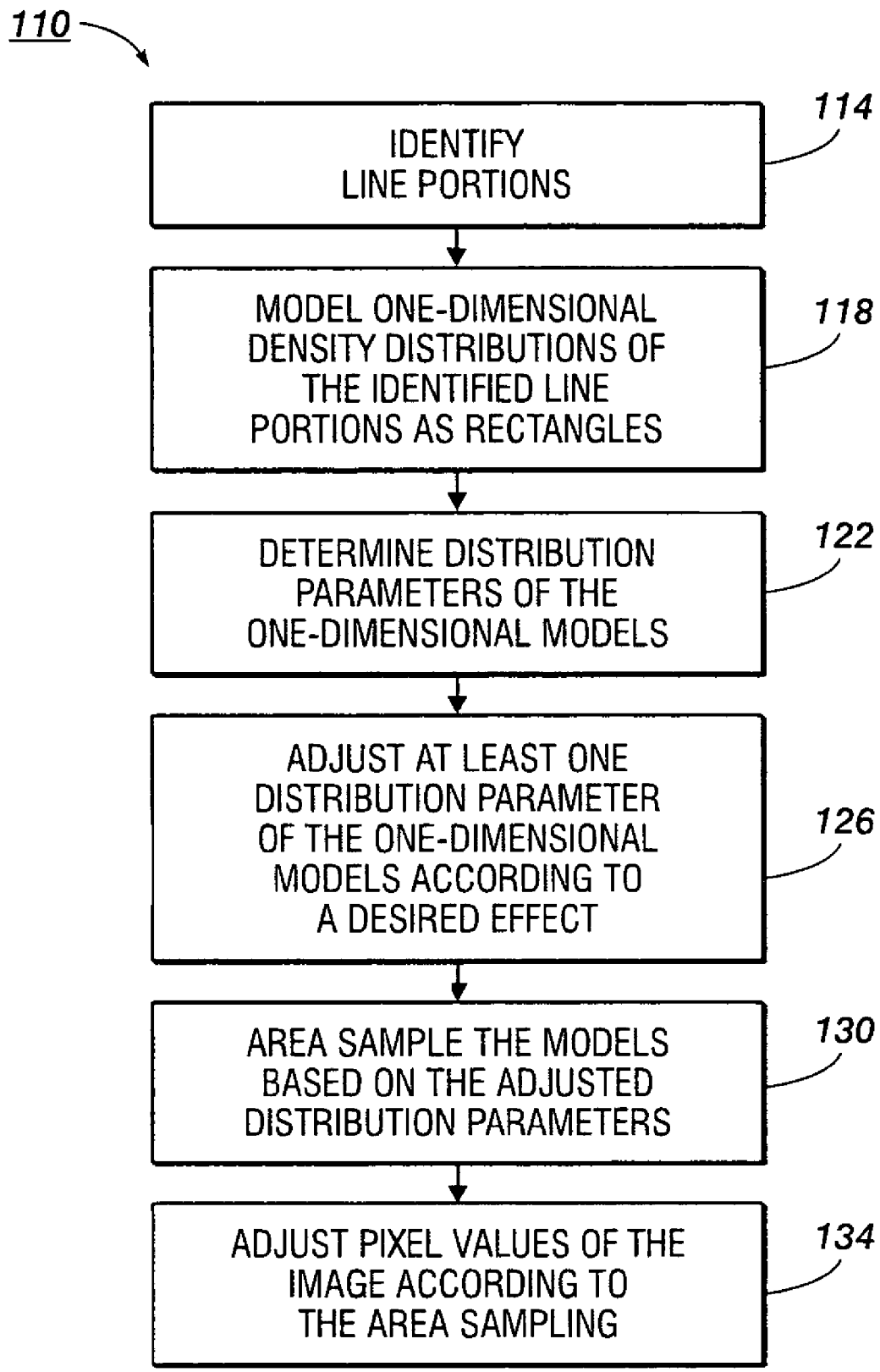
FIG. 1 and FIG. 2 are outlines of methods for adjusting image objects.
Figure 2:
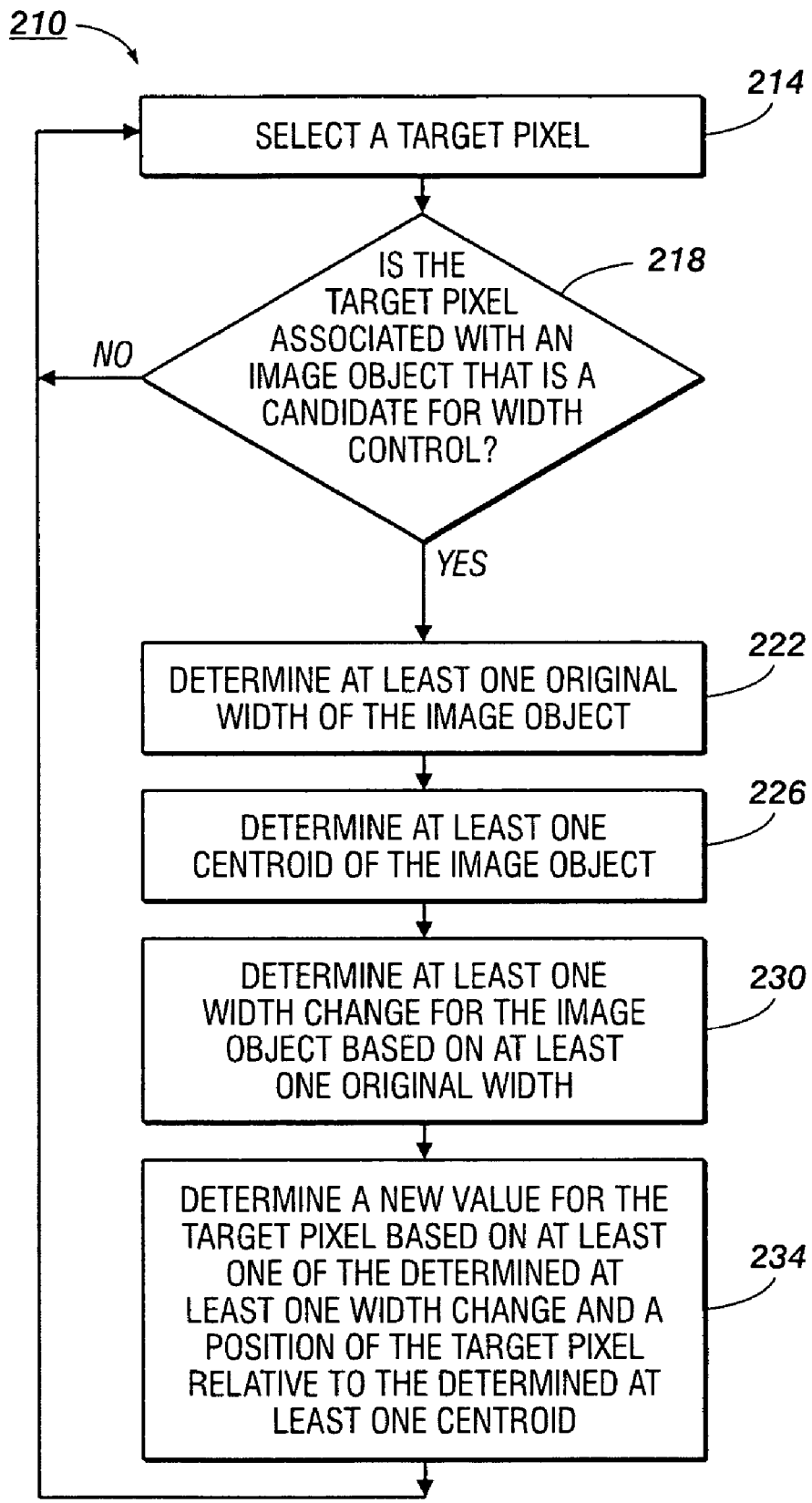

Referring to FIG. 1, a method 110 for adjusting an image can include identifying 114 line portions within the image, modeling 118 one-dimensional density distributions of the identified line portions as rectangles, determining 122 distribution parameters of the one-dimensional models, adjusting 126 at least one distribution parameter of the one-dimensional models according to a desired affect, area sampling 130 the models based on the adjusted distribution parameters and adjusting 134 pixel values of the image according to the area sampling.

Identifying 114 line portions can include identifying any small feature. For example, even an isolated dot the size of a single pixel can be considered a portion of a line. As indicated above, Identifying 114 line portions can be considered to mean identify 114 any portions of the image for which the adjustment 110 is appropriate. For instance, it might not be appropriate to apply line width adjustment to portions of an image associated with contone images or photographs. But, it might be appropriate to adjust or change parameters of thin lines, curves, circles, and text. Such line or image object portions may be identified 114 by simply examining tag values associated with pixels of the image. For instance, such tags are often supplied by Digital Front Ends (DFE) used in image authoring or in image rasterization (RIPing). Alternatively, as will be explained in greater detail below, target pixels and pixels neighboring the target pixels may be examined, tested or analyzed to identify 114 or determine if the target pixels are associated with such line portions.

Modeling 118 one-dimensional density distributions of the identified line portions as rectangles can include defining parameters describing the identified 114 line portions. For instance, a lightness or darkness of a line portion may be modeled as a height of a rectangle. A width of an identified 114 line portion may be modeled as a width of a rectangle. A location of an identified 114 line portion may be modeled as a center line or centroid of the rectangle. The height of the rectangle or lightness or darkness may be measured or determined with reference to a reference position or background lightness or darkness.

Determining 122 distribution parameters of the one-dimensional models can include analyzing or processing pixel values in and around the identified 114 line portions. For instance, as will be explained in greater detail below, target pixels and pixels neighboring the target pixels may be compared and otherwise analyzed to determine 122 distribution parameters of the one-dimensional models. For instance, the distribution parameters determined 122 for a particular identified 114 line portion describe characteristics of the particular line portion.

Adjusting 126 at least one distribution parameter according to the desired affect can include, for example, maintaining a position or centroid of the modeled 118 identified 114 line portions but changing, for example, a height (lightness or darkness) and/or width parameter value of the models. For instance, the width parameter may be changed by adding or subtracting a constant width change value (e.g., $\delta$). A width change ($\delta$) may be a function of an original width parameter. For instance, it may be desired to increase or decrease the width of an identified 114 line portion by a percentage of an original width of the identified 114 line portion. Alternatively, line portions that have relatively thick original widths may be unadjusted or adjusted by only a small width change ($\delta$), while relatively thin line portions are thickened to a greater degree. For instance, it may be desirable to adjust an image so that all line portions are 3 or more pixels wide. In that case, a width change ($\delta$) may be determined to be whatever value is required to increase the width parameter of the modeled 118 identified 114 line portion to a value of 3. Identified 114 line portions that have original width parameter values determined 122 to be 3 or greater might be adjusted 126 to have the same value as originally determined 122, or be unadjusted.

Area sampling 130 the models based on the adjusted distribution parameters can include treating the rectangle described by the adjusted 126 distribution parameters as if it were a line portion described in the original image and processing that portion of the image so as to simulate re-sampling or re-rasterizing that portion of the image to generate new pixel values for that portion of the image.

Adjusting 134 pixel values of the image according to the area sampling can include replacing pixel values or modifying pixel values by pixel value change amounts implied by the results of the area sampling 130.

For instance, an illustrative embodiment includes a method 210 for controlling a width of one or more image objects. The method 210 can include selecting 214 a target pixel and determining 218 if the target pixel is associated with an image object that is a candidate for width control. If 218 the target pixel is associated with an image object that is a candidate for width control, the method 210 can include determining 222 at least one width of the image object, determining 226 at least one centroid of the image object, determining 230 at least one width change for the image object based on the at least one original width, and determining 234 a new value for the target pixel based on at least one of the determined at least one width change and a position of the target pixel relative to the determined at least one centroid.

For instance, the method 210 can be performed on each pixel in at least a portion of an image. For example, a portion of an image may be tagged as including text or line art. The method 210 may be performed on a plurality of pixels in parallel or may be performed serially one pixel at a time. Alternatively, the method 210 may be performed according to some combination of parallel and serial processing. For instance, a group of pixels may be processed in parallel, with selected groups being processed one after another.

Determining 218 if a target pixel is associated with an image object that is a candidate for width control can be achieved by examining a tag such as a meta-tag associated with the target pixel. For example, a Digital Front End (DFE) may associate a pixel with a tag during a rasterization process. For instance, a tag may indicate that a pixel is associated with text or line art or some other thin or small structure. Alternatively, a tag may indicate that a pixel is associated with a pictorial image, such as a photograph. Pixels with such pictorial tags might be determined 218 not to be candidates for adjustment or width control.

Alternatively, whether or not a target pixel is associated with an image object that is a candidate for adjustment or width control may be determined 218 based on an analysis of pixel values of the target pixel and pixels neighboring the target pixel. For instance, pixel values of pixels within one or more windows surrounding the target pixel are analyzed. For example, referring to FIG. 3, a two-dimensional window identifying pixels neighboring a target pixel for consideration, such as, for example, a 9×9 window 310 around a target pixel 314 may be considered. For instance, a number of pixels having pixel values within a certain range may be determined. For instance, the range may include values considered to be associated with pictorial or photographic images. Therefore, if the count or number of pixels within the range is above a threshold, the determination 218 is made that the target pixel is not associated with an image object that is a candidate for width control. If the count is below the threshold, the determination 218 is made that the target pixel 314 is associated with an image object that is a candidate for width control.

Alternatively, pixels within one or more vector or one-dimensional windows around the target pixel 314 may be considered. For instance, pixels within one or more of a horizontal 318, vertical 322, left-sloping 326 or right-sloping 330 diagonal window may be analyzed. For instance, a range of gray values within one or more of these windows 318, 322, 326, 330 may be considered. If the range of values within the considered window(s) is below a range threshold, the determination 218 may be made that the target pixel 314 is not associated with a candidate for width control. Alternatively, if the range of values (i.e., the difference between a maximum pixel value and a minimum pixel value) within the considered windows (e.g., 310, 318, 322, 326, 330) is above the range threshold, the determination 218 may be made that the target pixel 314 is associated with an image object that is a candidate for width control.

In yet another alternative, one or more vector windows (e.g., 318, 322, 326, 330) may be checked or analyzed for the presence of a single peak. For instance, a statistical analysis may be performed on values of pixels within a vector window. For example, a variance of values within a window may be determined. If the variance is relatively high, it may indicate that values within the window are relatively spread out and are not associated with an image object, such as a line, line art or text that is a candidate for width control. Conversely, if the variance is relatively low, the determination 218 may be made that the target pixel is associated with an image object that is a candidate for width control.

Another technique that can be used to determine if a window includes a single peak is to compare respective values of respective pixels at edges of a window to values of pixels in a central portion of the window. For instance, if pixel values at both edges of a vector window are low and there is a high valued pixel in the central portion of the window, then a positive (e.g., black) line may be intersecting the window. Conversely, if the pixel values at both edges of the vector window are high and there is a low value pixel in the central portion of the window, then a negative line (e.g., white) may be crossing the window. In either case, the determination 218 may be made that the target pixel is associated with a candidate for width control.

In a still further technique for searching for a peak within a window, differences between values of neighboring pixels within the window are determined. If a sign changes in neighboring pixel value differences (e.g., from positive to negative or negative to positive) as processing traverses a window, then the window may include a peak, and the determination 218 may be made that the target pixel 314 is associated with an image object that is a candidate for width control.

Determining 222 at least one original width of the image object (that the target pixel is associated with) can be based on a model or predetermined assumptions about characteristics of candidate image objects. For example, determining 222 the at least one original width of the image object can be based on a one-dimensional model 118 relating pixel values of pixels within a window to values associated with a rectangle function. For instance, referring to FIG. 4A and FIG. 4B, "Linear Systems, Fourier Transforms and Optics," McGraw-Hill, 1996, (pp. 43-44) by J. Gaskill, describes a rectangle function rect( ) 410 that defines a height of a rectangle as a function of position in a width direction (e.g., x). The rect( ) function takes on a value of 0 for positions (x) outside a rectangle, values of ½ for positions (x) on borders or edges of the rectangle and values of 1 for positions (x) within the borders of the rectangle. Gaskill defines the center of the rectangle in the x direction to be at $x=x_0$ and the width of the rectangle to be equal to the magnitude of a parameter b (|b|). Gaskill's rect( ) function can be adapted for use in modeling 118 a one-dimensional density distribution of the identified 114 line portions, which can be used to determine 222, for example, at least one original width of the image object and to determine 226 at least one centroid of the image object. For example, for each vector window (e.g., 318, 322, 326, 330), or a selected vector window, a black, gray or positive line distribution can be modeled as, $$f(x) = a_1 + a_2 rect[(x - m_1)/m_0] \quad (1)$$

where $a_1$ is a gray level of a background near the image object, $a_2$ is an image object (e.g., line) density contone or gray level value (or model rectangle height above or below a background level), such as, for example, 255 for a black line on a white (0) background (note that $a_2$ could be a different value for systems that use a different number of bits or when the model is applied to gray lines), x is a position along the direction of the vector window, $m_1$ is a position of a center of the line in the x direction (one-dimensional centroid), and $m_0$ is the width of the rectangle or line portion being modeled. An example of a vector window in association with these parameters is shown in FIG. 5.

Figure 5:
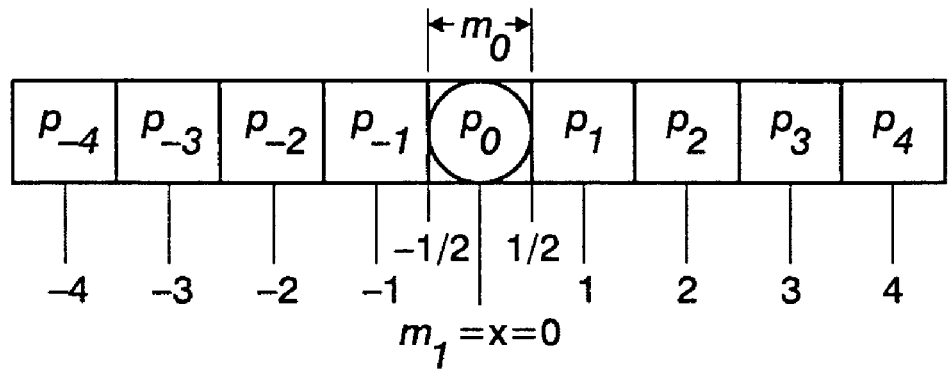
FIG. 5 illustrates aspects of a vector window.

Referring to FIG. 5, the pixel value for the ith pixel is denoted as $p_i$, and $x_i$ denotes the position of $p_i$ in the window. The width and center of the ideal line model can be approximated by $$\text{Width} = m_0 = \frac{1}{a_2} \sum_i p_i \quad (2)$$

$$\text{Center} = m_1 = \frac{1}{a_2 m_0} \sum_i x_i p_i \quad (3)$$

These values, $m_1$ in particular, are approximations due to the spatial sampling of a non band-limited function. An exact value can be determined for $m_1$ using an interpolation formula, but at this time we do not see significant errors arising from the approximation. The exact formula is the following:

$$m_1 = x_L + \left(1 + \sum_i INT\left[\frac{p_i}{a_2}\right]\right) / 2 + (p_L - p_R)/2 \quad (4)$$

where $x_L$ denotes the pixel position at the left edge of the line, $p_L$ denotes the pixel value at that left edge and $p_R$ denotes the pixel value on the right edge of the line or image object. These edge-pixel positions could be determined by examining differences between neighboring pixels if this exact formula was needed.

Figure 6:
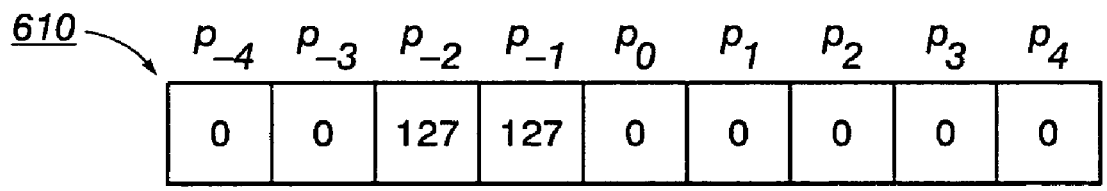
FIG. 6 is a vector window including illustrative pixel values.
Figure 7:
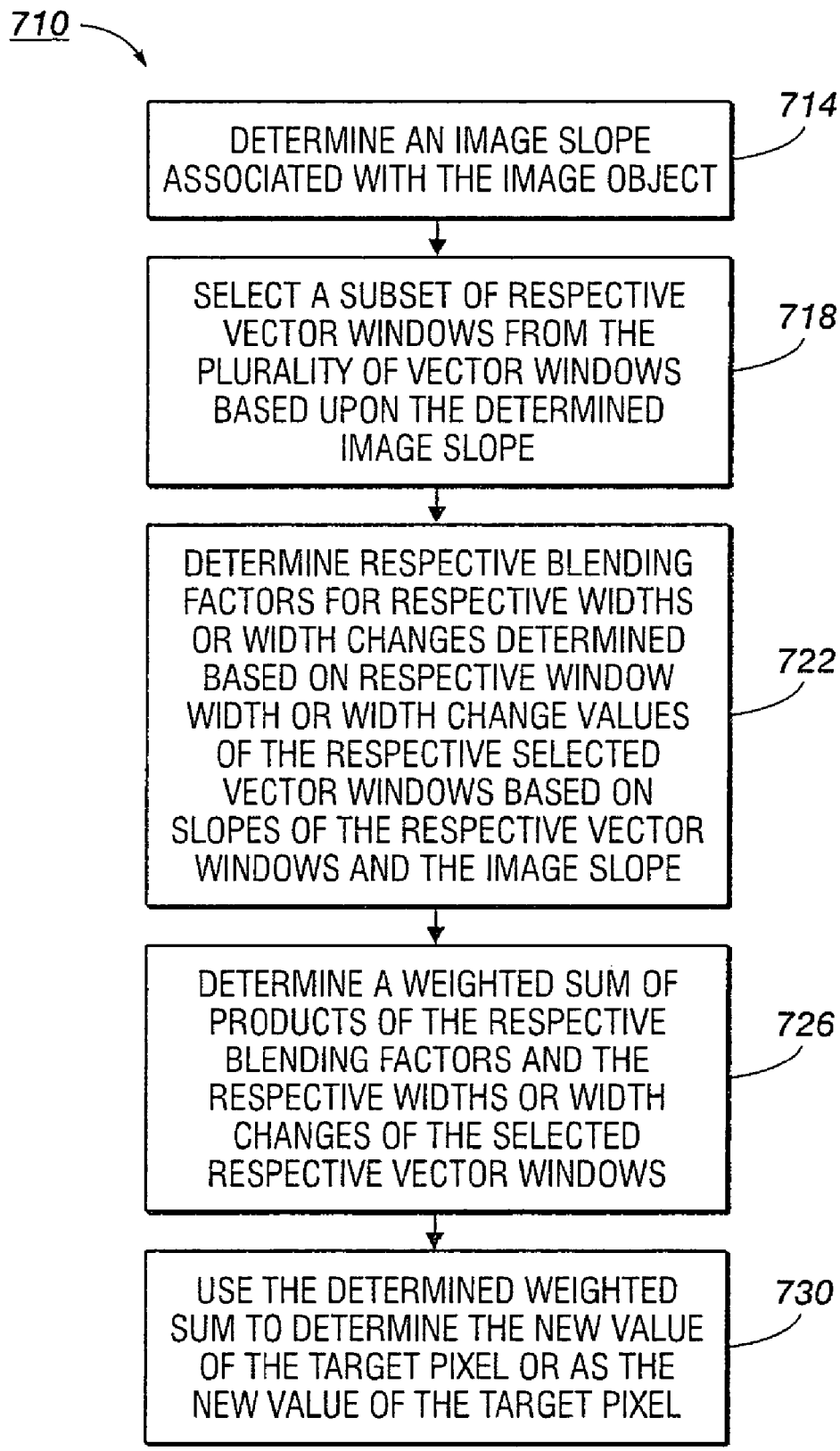
FIG. 7 is an outline of a method for determining a new value of a target pixel.

A numerical example may be helpful. Referring to FIG. 6, an illustrative vector window 610 (similar to any of 318, 322, 326, 330) encompasses a target pixel $p_0$ and neighboring pixels $p_1$-$p_4$, $p_{-1}$-$p_{-4}$. The pixels at positions $p_{-1}$ and $p_{-2}$ have a gray level or contone values of 127. The pixels at the remainder of the positions within the vector window have contone or gray level values of 0. The target pixel ($p_0$) may be identified 114 as being associated with a line portion or other image object that is a candidate for width control. For example, the target pixel $p_0$ may be associated with a tag so indicating. Alternatively, any of the tests described above, such as counting the number of pixels in a certain gray range within a two-dimensional window, checking the range of gray values within the window (maximum value-minimum value), or checking for a single peak within the window 610 may be used to determine 218 that the target pixel $p_0$ is associated with a candidate for width control.

The sum of the pixel values in the window is equal to 254. Therefore, according to the modeling 118, and Eq. (2) an original width $m_0$ of the image object (that the target pixel $p_0$ is determined 218 to be associated with) is determined 222 to be 0.996 pixels. Since width measurements of this kind are a function of the window selected to make the measurement, they are referred to herein as window widths. For simplicity, in this example, this original object width determined 222 from the illustrative window 610 will be rounded up and considered to be a window width of 1 pixel.

Other widths of the image object may also be determined 222. For example, if the illustrative vector window 610 is a horizontal vector window (e.g., 318), then other vector windows, such as the vertical 322, left diagonal 326 and right diagonal windows may also be applied to the target pixel $p_0$. Depending on the size and shape of the image object, portions of the image object may be included within those windows. Therefore, additional original widths (i.e., window widths) of the image object may be determined 222 based on values of pixels within those windows.

A most accurate image object width will be calculated from a vector window that is orthogonal to the image object portion in question. Windows that cross the image object at other angles will generate determined 222 widths that are wider than an actual width of the image object or image object portion. Therefore, determining 222 an original width of the image object can include determining a least respective window width value of a respective plurality of window widths and using the least respective value as an original width of the image object. Alternatively, as will be described in greater detail below, window widths determined 222 from a plurality of vector windows may be used in combination to determine an original width of the image object and/or determine 230 at least one width change for the image object.

According to the modeling 118 applied to the illustrative window 610, the center or one-dimensional centroid of the image object $m_1$ is determined 226 through Eq. (3) to be at pixel position $-1\frac{1}{2}$. For instance, the image may be the result of a scanning process. The image object may be a one-pixel wide line located at a position between two sensors on a scan bar and half covering each of them. Therefore, each sensor reported a contone or gray level of 127.

Determining 230 the at least one output width based on the at least one original input width $m_0$ can include, for example, using $m_0$ to index a lookup table (LUT) of output widths. Alternatively, $m_0$ may be used as input to an analytical function that provides the output width. In some applications, a desired width or parameter change might not be dependent on the input. For instance, it may be desirable to adjust 126 or determine 230 a parameter (e.g., width) by adding or subtracting a fixed amount to the original parameter or width of all line portions or image objects in an image or image portion in order to, for example, adjust the general appearance of an image. For instance, such a fixed parameter change may be used to make a rendered image lighter or darker. However the parameter or width change is determined, we may represent it as $\delta$. The symbol $\delta$ represents a difference or change from the input or original width or other model parameter. For the positive (black) line example, the adjusted line can be modeled 118 according to:

$$f'(x) = a_1 + a_2 \text{rect}[(x-m_1)/(m_0')]; \quad m_0' = m_0 + \delta \quad (5)$$

where $m_0'$ represents the adjusted 126 parameter or determined 230 at least one width change.

Adjusting pixel values 134 or determining 234 a new value for the target pixel $p_0$ may include area sampling (e.g. 130) the adjusted model or line width distribution. For example, a new target pixel value $p_0'$ can be determined 234 according to the line integration:

$$p_0' = \int_{\text{MAX}[\frac{-1}{2}, (m_1 - \frac{1}{2}(m_0 + \delta))]}^{\text{MIN}[\frac{1}{2}, (m_1 + \frac{1}{2}(m_0 + \delta))]} a_2 \, dx \quad (6)$$

The lower integration limit comes from either the left edge of the adjusted 126, 230 rectangle model or the left edge of the target pixel, whichever is greater. The upper integration limit comes from either the right edge of the adjusted 126, 230 rectangle model or the right edge of the target pixel, whichever is lesser. In other words, the integration is taken over the width of the target pixel or over a portion of the target pixel that is determined to be a component of the adjusted line or image object. The integral may be solved to yield the simple form:

$$p_0' = a_2 \left( \text{MIN}\left[\frac{1}{2}, \left(m_1 + \frac{1}{2}(m_0 + \delta)\right)\right] - \text{MAX}\left[\frac{-1}{2}, \left(m_1 - \frac{1}{2}(m_0 + \delta)\right)\right] \right) \quad (7)$$

Subtracting $\frac{1}{2}$ from both terms associated with the MIN function and adding $\frac{1}{2}$ to the resulting MIN function value provides a form that may be implemented as sign checking. Similarly, adding $\frac{1}{2}$ to both terms associated with the MAX function and subtracting $\frac{1}{2}$ to the resulting MAX function provides a form that can be implemented as simple sign checking.

$$p_0' = a_2 \left\{ \left( \text{MIN}\left[0, \left(m_1 + \frac{1}{2}(m_0 + \delta - 1)\right)\right] + \frac{1}{2} \right) - \left( \text{MAX}\left[0, \left(m_1 - \frac{1}{2}(m_0 + \delta - 1)\right)\right] - \frac{1}{2} \right) \right\} \quad (8)$$

This can be simplified by letting $k = \frac{1}{2}(m_0 + \delta - 1)$, yielding:

$$p_0' = a_2(1 + \text{MIN}[0, m_1 + k] - \text{MAX}[0, m_1 - k]) \quad (9)$$

or $$p_0' = a_2(1 + \text{MIN}[0, m_1 + k] + \text{MIN}[0, k - m_1]) \quad (10)$$

Performing these calculations can require fewer system resources than performing line width control via template matching techniques.

Returning briefly to the numerical example of FIG. 6, wherein $m_0$ was determined to equal approximately 1 and $m_1$ was determined to equal $-1\frac{1}{2}$, if it is desired to grow or thicken the line or image object (e.g., associated with pixel positions $p_{-1}$ and $p_{-2}$) in the illustrative vector window 610 by a width change amount $\delta = 1.5$, then $k = \frac{1}{2}(1+1.5-1) = 0.75$. According to Eq. (10), $p_0' = 255(1+\text{MIN}[0, 0.75] + \text{MIN}[0, -0.75]) = 255 \times 0.25 \approx 64$.

It should be understood that determining 234 this new pixel value for the target pixel does not necessarily achieve the entire image object or line thickening or adjustment. The thickening or object adjustment may be achieved when other pixels are identified 114 or selected 214 as target pixels and processed in a similar manner. For instance, other vector windows are centered on other target pixels neighboring the present target pixel $p_0$ of the illustrative vector window 610, and values of some of those other target pixels are adjusted or replaced. For instance, as other pixels are processed, the value of the pixel at position $p_{-3}$ in the illustrative vector window 610 may eventually be adjusted 134 or replaced with a determined 234 new value of 64. The processing of these other target pixels may occur in parallel with, or sequentially to, the processing of the target pixel $p_0$ described above.

As indicated above, determining 222 at least one width can include using the result or window width from the window that observes or generates the least or smallest width measurement, because of all the individual measurements or window widths, the smallest or least window width most accurately represents the width of a line or object.

However, while this independent or single window processing and arbitration has advantages in speed and ease of computation, it can introduce small inaccuracies when the assumption that the selected window is orthogonal to the line or object is incorrect. These inaccuracies can be reduced by determining 222 a plurality of window widths or parameters from a plurality of vector windows and using the plurality of window widths or parameters to determine a more accurate width or parameter. For example, a more accurate width might be estimated from the vertical 322 and horizontal 318 windows using:

$$w = w_v / \sqrt{1 + (w_v/w_h)^2} \qquad (11)$$

where $w_v$ is $m_0$ determined (e.g., 122, 222) from the vertical window 322, $w_h$ is $m_0$ determined (e.g., 122, 222) from the horizontal 318 window, and w is the width estimated from these two projections. The other windows (e.g., 326, 330) can be used as well, and problem cases (e.g., zero width) can be avoided by checking $m_0$ values prior to calculating w. A combined width w determined 222 from a projection formula [e.g., Eq. (11)] can be directly used in the adjusted rectangle model [e.g., Eq. (5)], or it can be projected back into one of the windows to determine the growth or adjustment (e.g., δ).

One method 710 for determining 234 a new value for the target pixel or adjusting 134 pixel values can include determining 714 an image slope associated with the image object, selecting 718 a subset of respective vector windows from the plurality of vector windows based upon the determined image slope, determining 722 respective blending factors for respective widths or width changes determined based on respective window width values of the respective selected vector windows, based on slopes of the respective selected 718 vector windows and the image slope, determining 726 a weighted sum of products of the respective blending factors and the respective widths or width changes and using 730 the determined weighted sum to determine 234 the new value of the target pixel or as the new value of the target pixel.

For instance, the image slope can be determined 714 through statistical analysis and/or curve fitting techniques. For example, a two-dimensional window centered on the target pixel can be applied to an area around the target pixel. Portions of the image object within the two-dimensional window, for which centroids can be determined, can be selected. Centroids are determined for the selected plurality of image object portions and the image slope is calculated based on the plurality of respective centroids.

Figure 8:
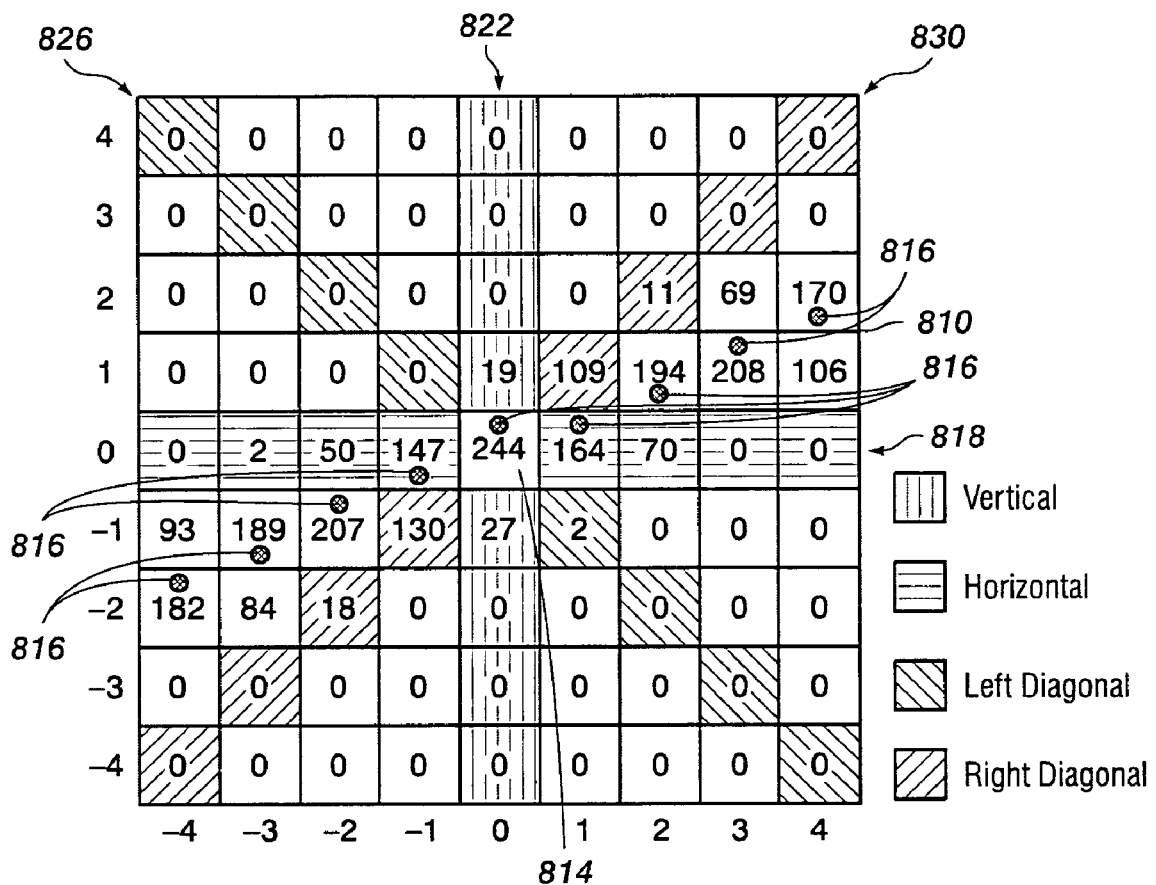
FIG. 8 illustrates various vector windows in association with image data.

For example, referring to FIG. 8, a two-dimensional window 810 (e.g., 9×9) encompasses pixels neighboring a target pixel 814. Rows and columns of the window are associated with index values ranging from −4 to 4. Many of the pixels encompassed by the two-dimensional window 810 have a value (e.g., 0) associated with a background of an image. Other pixels encompassed by the two-dimensional window 810 have values (e.g., non-zero) and positions associated with a line or image object.

As described above, tests can be performed to determine if an image object or line portion that is a candidate for parameter adjustment or width control (e.g., 114, 218) is included within the two-dimensional window. Additionally, or alternatively, an attempt can be made to calculate centroids of pixel values for rows and/or columns of the two-dimensional window 810. For example, centroids 816 are calculated for each of the columns (−4–4). Alternatively, an attempt is made to calculate centroids for each of the rows of the two-dimensional window 810. For instance, if centroids cannot be calculated for a sufficient number of appropriately located columns, then an attempt is made to calculate centroids for rows. Alternatively, calculating centroids for rows is attempted first, and column centroid calculation is attempted as a backup. If sufficient centroids cannot be calculated for either rows or columns, then a determination may be made that the target pixel 814 is not associated with a candidate for parameter adjustment or, for example, width control.

Assuming appropriate centroids (e.g., 816) can be calculated, at least some of them are used to calculate a slope for the image object. For example, an equation for a line can be written:

$$y = \alpha x + b$$

the value of the slope of the best fit line is given by:

$$\alpha = E\{xy\}/E\{x^2\} \qquad (11)$$

where E{ } is an expected value statistic.

For example, the slope α is determined 714 based on the centroids 816 of columns −3, −1, 1, 3. Alternatively, if centroids are not available for those columns, other columns may be used. For example, centroids of columns −4, −2, 0 and 2 or columns −2, 0, 2, 4 might be used. Selecting portions of the image object that are evenly spaced from each other in at least one of the two dimensions of the two-dimensional window (e.g., 810), as are the image portions in the selected sets of image columns (e.g., −3, −1, 1, 3 or −4, −2, 0, 2 or −2, 0, 2, 4) provides a convenience for performing the slope or estimated value calculations. However, other sets of columns may be used. Indeed; a slope can be calculated with only two centroids. However, using additional centroids reduces errors associated with quantization and the like. Indeed, using a larger(greater than 9×9)two-dimensional window, including additional columns and/or additional rows, can improve calculation accuracy. However, the increased accuracy comes at the expense of increased computational resource demands.

Additional statistics can be calculated to verify the validity of the slope calculation. For example, the mean-square error of the fit of the line is given by:

$$\text{MSE of fit} = E\{y^2\} - E^2\{xy\}/E\{x^2\}.$$

Alternatively, if the application allows the consistent use of centroids in particular columns or particular rows, then a simplified (i.e., without a division) error calculation can be made. For example:

$$\text{Multiplier MSE of fit} = E\{x^2\}E\{y^2\} - E^2\{xy\}$$

can be used.

Assuming the slope calculation or determination 714 is valid, a subset of respective vector windows is selected 718 based on the determined 714 image slope. For example, for the image object of FIG. 8, Eq. (11) returns a slope α of about 0.414, which corresponds to an angle of about 22.5 degrees.

As explained above, it is desirable to select a vector window that is orthogonal to an image object in order to generate the most accurate image object width measurement. However, in the illustrated embodiment, the only available vector windows are a horizontal (0 degrees) 818, vertical (90 degrees) 822, left diagonal (−45 degrees) 826 and a right diagonal (45 degrees) 830 vector window. None of the available vector windows (818, 822, 826, 830) are oriented at −77.5 or 112.5 degrees (the orthogonal direction to 22.5 degrees). However, the vertical 822 and left diagonal 826 vector windows are at orientations that are nearest the orientation of the unavailable orthogonal vector window and will therefore be associated with the most accurate available window width measurements and/or with change determinations for the image object of FIG. 8. Blending these width measurements (window widths), or width changes determined from these width measurements, can generate a more accurate blended width or blended width change.

For example, if the slope of the line or image object is 22.5 degrees, it can be represented as the sum of a unit vector in the horizontal direction (0 degrees) and one in the right diagonal direction (45 degrees). Non-orthogonal projection of a unit vector in the direction of the image slope (e.g., 22.5 degrees) can be used to determine 722 the respective blending factors for the respective widths or width changes associated with the selected 718 vector windows. The horizontal direction is selected for projection because it is orthogonal to the available and selected 718 vertical 822 vector window. The right diagonal direction is selected for projection because it is orthogonal to the available and selected 718 left 326 vector window. For example, as indicated below, through non-orthogonal projection, weights or blending factors for both the horizontal and right diagonal projection of the 22.5 degree image object are 0.5412.

Unit vector at 22.5 degrees=$0.5412h+0.5412D_{45}$

In general, if the angle of a line or image object is between 0 and 45 (i.e., the slope α is between 0 and 1), then the unit vector can be estimated by:

Unit vector at slope $\alpha \approx (1-a)h+\alpha D_{45}$

Using this estimate avoids having to perform the relatively complicated non-orthogonal projection calculations. Given this, we could make the width or width change for a line at a slope of α (α between 0 and 1) equal to:

(1−α) Width_or_Width change_associated with_Vertical_Window+αWidth_or_Width change_associated with_left_diagonal_window For any angle, a similar weighted or blended combination of two projections of the image object on two directions that are orthogonal to available vector windows can be found. For example, if the angle or slope of the image object is between 45 and 90, the width or width change will be a weighted or blended combination of the width or width change associated with the left diagonal window 826 and the growth associated with the horizontal vector window 818. Geometric symmetry can be used to determine the weights for slopes outside the 0 to 1 range. For example, if the slope is negative but between 0 and −1, this corresponds to an angle between 0 and −45 degrees. In this case, the line or image object is bounded by the horizontal direction and the −45 direction. The width or width change is then a weighted or blended combination of the window width or width change associated with the vertical window (e.g., 822) and the window width or width change associated with the +45 degree or left leaning window (e.g., 826). As before, the weighting or blending factor associated with the on the window width or width change associated with the vertical window (e.g., 822) will be based upon the projection of the line associated with the horizontal direction, which we can estimate as (1−|α|) This is because the projection of a line with angle α onto the horizontal direction is the same as the projection of a line with angle (−α) onto the horizontal direction. Similarly, the projection of the line onto the −45 degree direction can be estimated by |α|, since the projection of a line with angle α onto the +45 direction is the same as the projection of a line with angle (−α) onto the −45 direction. So for values of slope between −1 and 0, we just need to use the absolute value of the slope in the projection calculations. We can similarly extend the symmetry concept to values of α greater than one. In these cases, we use the reciprocal of the slope—in other words, we rotate the problem 90 degrees and so the angle is now within the 0 to 1 range and then use similar logic. This now creates the 4 possible combinations of angle:

$0<=\alpha<=1$ (1−|α|) Width_or_Width change associated with_Vertical_Window+|α|Width_or_Width change_associated with −45_diagonal_window $-1<=\alpha<=0$ (1−|α|) Width_or_Width change associated with_Vertical_Window+|α|Width_or_Width change_associated with +45_diagonal_window $|\alpha|>1$ (1−1/|α|) Width_or_Width change associated with_Horizontal_Window+1/|α|Width_or_Width change_associated with −45_diagonal_window $\alpha<-1$ (1−1/|α|) Width_or_Width change associated with_Horizontal_Window+1/|α|Width_or_Width change_associated with +45_diagonal_window For the most part, the previous discussion has been related to a black or dark line or image object associated with a white or light background. Adaptations can be made to accommodate a white or light line on a black or dark background. For example, the values of pixels can be inverted such that pixel values of 0 become 255, pixel values of 255 become 0, pixel values of 1 become 254, pixel values of 254 become 1, and so on. The inverted pixel values are then used in the processing described above. When width or parameter changes or adjustments are determined 134, 234, 730, the inversion process is repeated to restore the original sense of the pixels.

Alternatively, accommodations can be made to the models (e.g., Eq. 1 and 5). For example, see Eqs. (12) and (13).

$$f(x)=\alpha_1+\{\alpha_2-\alpha_2 rect[(x-m_1)/m_0]\} \quad (12)$$

$$f'(x)=\alpha_1+\{\alpha_2-\alpha_2 rect[(x-m_1)/m_0']\},\ m_0'=(m_0+\delta) \quad (13)$$

Background level can be determined by searching for some minimum number of pixels possessing the same gray level. That gray level can then be used as the background offset (i.e., $a_1$) in the model. For a 9×1 vector window (e.g., 318, 322, 326 or 330) that is to be used in an attempt to adjust lines that are 2 pixels wide or less, 5 has been used as a threshold or minimum number of pixels required to be at the same gray level to consider that level to be background. It is anticipated that other windows and/or desired line widths could be associated with a background pixel count threshold that is approximately window_size-line_width+2. The formula can be extended to two-dimensional windows with some modeling of how a line or image structure will lie in the window. Some embodiments allow some variation in background values.

In one software implementation of this algorithm, background counts are determined using an incremented Look-Up Table (LUT). An 8-bit LUT possessing addresses 0-255 is initialized to have entry values of 0. For each pixel value in the observation window, the LUT entry at the address associated with the gray level of that pixel is incremented. If a LUT entry (or narrow range of entries) receives the minimum number of counts (e.g., 5), that (those) address(es) is (are) considered to correspond to the gray level of the background.

The output pixel value (i.e., the new value of the target pixel) could be in forms other than the 1× gray-scale pixel values implied above. For example, the output pixel value could be in binary high addressable form. Additionally, integration limits [see Eqs. (6-10)] that comprehend the high addressable output sub-pixel boundaries can be used along with thresholding to the output quantization.

Figure 9:
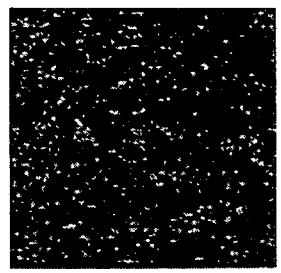
FIG. 9-FIG. 14 include unadjusted images and images adjusted according to methods described herein.
Figure 10:
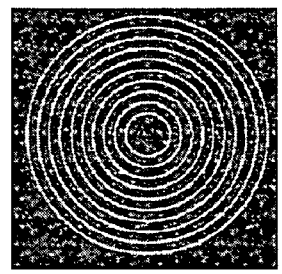

As indicated above, at least some image rendering systems fill in narrow lines so they do not appear, or appear only weakly. When processed according to the methods presented herein, the narrow white lines are well represented in a print. For example, FIG. 9 shows a print of a set of 0.75-pixel wide white concentric circles as rendered by a prior art device. FIG. 10 shows a compensated image where a width change (δ) of 1.25 pixels was added to the lines or concentric circles. The uncompensated image of FIG. 9 is filled in completely, and the image information is lost to the observer. The image (compensated according to the methods disclosed herein) of FIG. 10 shows a strong appearance for the circular lines, as well as very consistent line widths. Many other line width compensation algorithms suffer from obvious variations in line width.

Figure 11:
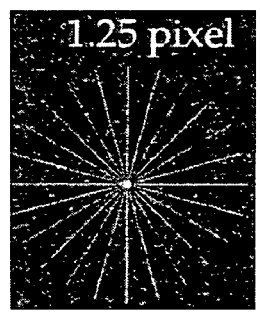
Figure 12:
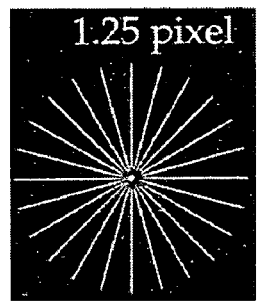

FIG. 11 shows a print of a 1.25-pixel wide white line star. FIG. 12 shows a compensated image where a width change (δ) of 0.75 pixels was added to the lines by methods such as those described above. The lines in the uncompensated image of FIG. 11 appear very weak. The compensated image of FIG. 12 shows a strong appearance of the lines, as desired. Also, the consistency of the line width is excellent. Some prior art image processors suffer from varying line width when rendering this pattern. For instance, some image processors make tradeoffs due to the computational complexity and memory requirements of their line width control algorithms and are able to consider, for example, only two vector windows when processing image objects. The methods presented herein do not suffer from such a computational and memory burden and, hence, time and processing power is available to consider additional windows and better process lines or image objects at all orientations.

Figure 13:
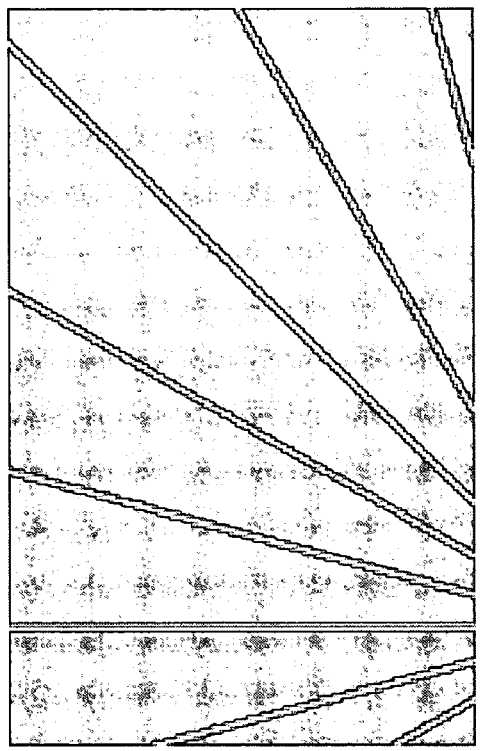
Figure 14:
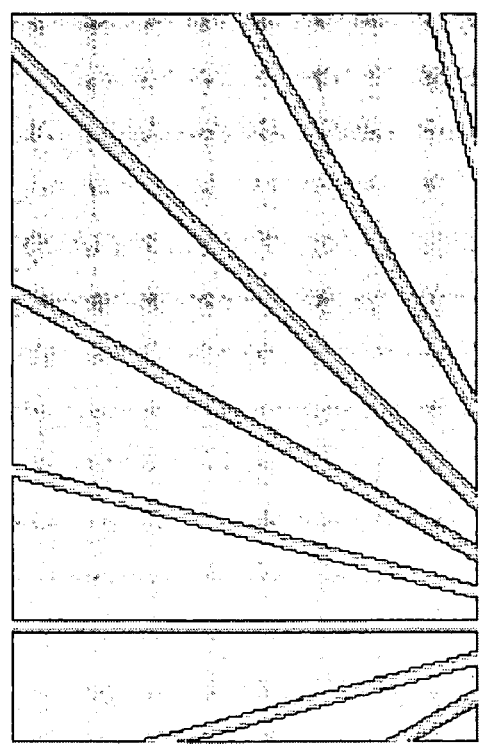

FIGS. 13 and 14 show an example of processing a section of a white star on a gray background. The gray level is 200, where 0 is white and 255 is black. It can be seen that the lines are all uniformly adjusted in width.

Figure 15:
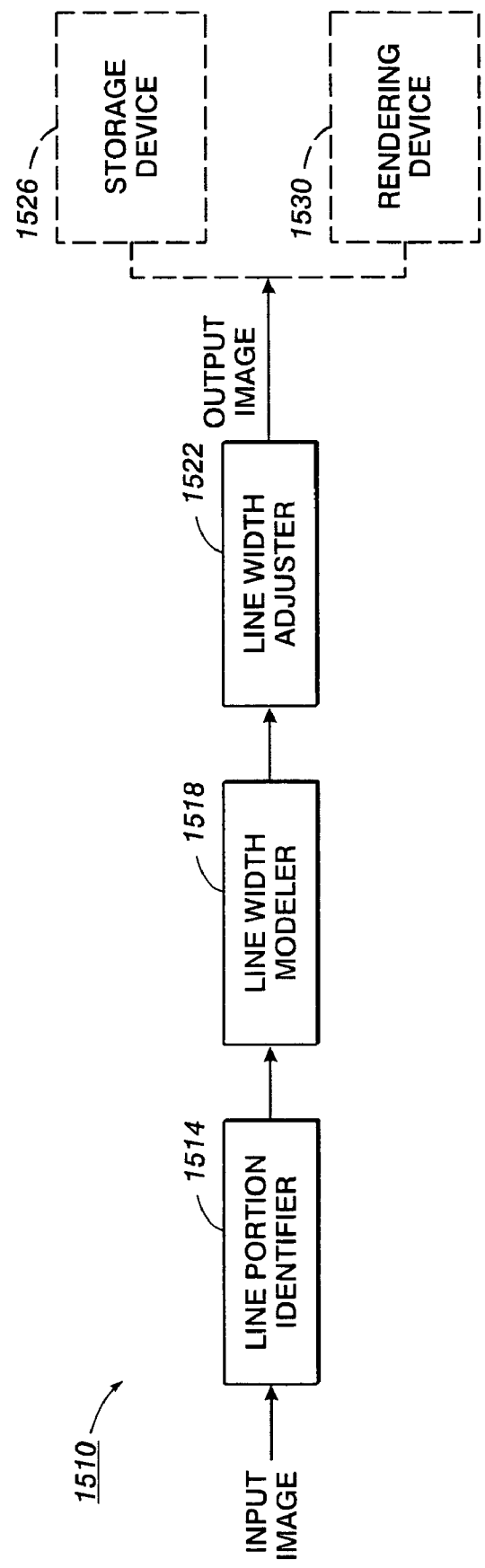
FIG. 15 is a block diagram of a system that is operative to adjust images.

Referring to FIG. 15, a system 1510 that is operative to adjust digital representation of an image that includes candidates for width control, such as text or line art, can include a line portion identifier 1514, a line width modeler 1518 and a line width adjuster 1522.

For example, the line portion identifier can be operative to identify 114, 218 portions of an image that are associated with width control candidates, such as portions of text or line art. For instance, the line portion identifier 1514 may read a tag associated with a pixel or set of pixels to determine 114, 218 if a pixel or collection of pixels is associated with text or line art. Additionally, or alternatively, the line portion identifier 1514 may apply one or more windows (e.g., 310, 330, 810) and perform tests, such as the gray value range test, single peak test and/or tests associated with slope determination, to target pixels and pixels neighboring the target pixels as described above.

The line width modeler 1518 can be operative to model 118 one-dimensional density distributions of the portions identified 114, 218 by the line portion identifier 1514 as, for example, rectangles. Additionally, the line width modeler 1518 can be operative to determine 122 distribution parameters of the one-dimensional models. For instance, the line width modeler 1518 may be operative to model 118 one-dimensional density distributions of the identified 114, 218 line portions by modeling 118 the identified 1514, 218 line portions according to Gaskill's rect( ) function [e.g., Eqs. (1), (5), (12) and (13)]. For example, the line width modeler 1518 can determine (e.g., 222, 226) a height (e.g., $a_2$), position (e.g., centroid), background level (e.g., $a_1$) and/or width (e.g., $m_0$) of the identified 114,218 image object or text or line art portion.

The line width adjuster 1522 can be operative to adjust or determine (e.g., 126, 230) at least one distribution parameter of the one-dimensional models according to a desired affect. Additionally, the line width adjuster 1522 may be operative to area sample [e.g., 130, Eqs. (6-10)] the models based on the adjusted distribution parameters. The line width adjuster 1522 may be further operative to adjust (e.g., 134, 234) pixel values of the digital representation of the image according to the area sample. For instance, the line width adjuster 1522 may be operative to perform area sampling (e.g., 130) and adjust 134 pixel values by integrating [e.g., Eqs. (6-10)) an adjusted line width distribution over a region of the target pixel and using a value resulting from the integration as the new pixel value of a target pixel. For instance, the value resulting from the integration may be used as a new value for the target pixel if the value resulting from the integration is non-negative. A negative integration value indicates that the target pixel is not included in the adjusted image object portion and is instead part of some other image feature, such as, an image background. Therefore, when the result of the integration is negative, a background value of, or associated with, the target pixel may be used by the line width adjuster 1522 as the new value of the target pixel. In this regard, the new value of the target pixel may be the original value of the target pixel or some other value indicative of a background gray level.

Output or adjusted images from the line width adjuster may be delivered to a storage device 1526 and/or one or more rendering devices 1530. For example, the storage device 1526 may include one or more of a computer memory, such as random access memory (RAM) or storage media, such as, magnetic media including, but not limited to, magnetic tapes and discs and optical media such as CD ROM. Furthermore, the storage device 1526 may include a computer network for transmitting output from the line width adjuster 1522 to another image processor, image processing system or rendering device. The rendering device or devices 1530 may include one or more display devices or marking engines including, but not limited to, cathode ray tubes (CRTs), liquid crystal displays (LCDs), plasma displays, ink jet marking engines, xerographic marking engines and electrophotographic marking engines.

The line identifier 1514, line modeler 1518 and line width adjuster 1522 may be implemented in various combinations of hardware and software including, but not limited to, microcontrollers, microprocessors, digital signal processors, computer memories, application specific integrated circuits (ASICs), field programmable gate arrays (FPGAs) and other devices.

Although reference has been made to the phrase—gray level—, the methods and systems disclosed herein are not limited to operation on monochrome images. For example, pixels of several color separations can be processed as described above. The claims can encompass embodiments that handle color image data.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for controlling a width of one or more image objects, the method comprising:
   for each pixel in at least a portion of an image, selecting the pixel as a target pixel;
   determining if the target pixel is associated with an image object that is a candidate for width control, and if the target pixel is associated with an image object that is a candidate for width control:
      determining at least one original width of the image object;
      determining at least one centroid of the image object;
      determining at least one width change for the image object based on the at least one original width; and
      determining a new value for the target pixel based on at least one of the determined at least one width change and a position of the target pixel relative to the determined at least one centroid, thereby controlling the width of the image object.

2. The method of claim 1 wherein determining if the target pixel is associated with an image object that is a candidate for width control comprises at least one of:
   counting a number of pixels within a 2 dimensional window around the target pixel that have values within a predetermined range and comparing that count to a threshold, wherein the determination as to whether the target pixel is associated with the image object is made according to the result of the comparison to the threshold, determining at least one respective range of values of respective pixels within at least one respective window around the target pixel and comparing the at least one determined range to a range threshold, wherein the determination as to whether the target pixel is associated with the image object is made according to the result of the comparison to the range threshold, and determining if values of pixels in at least one respective window around the target pixel include at least one respective single peak, wherein the determination as to whether the target pixel is associated with the image object is made according to the result of the determination regarding the inclusion of the at least one respective single peak.

3. The method of claim 2 wherein determining if values of pixels in the at least one respective window around the target pixel include the at least one respective single peak comprises:
   at least one of determining at least one respective variance of pixel values within the at least one window and comparing the at least one respective variance to a variance threshold, wherein a relatively low variance compared to the variance threshold is indicative of the presence of the at least one peak, comparing respective values of respective pixels at edges of the at least one respective window to each other and to respective values of pixels in a respective at least one central portion of the at least one respective window and searching for a respective sign change in differences between respective values of respective neighboring pixels, wherein the detection of the respective sign change is indicative of the presence of the at least one peak.

4. The method of claim 1 wherein determining at least one original width of the image object comprises:
   determining at least one sum based on pixel values of pixels within at least one window around the target pixel and determining the original width based on the determined at least one sum.

5. The method of claim 1 wherein determining the at least one centroid of the image object comprises:
   determining at least one respective sum of weighted respective pixel values of respective pixels within at least one respective window around the target pixel, wherein weights of the respective pixel values are functions of respective pixel positions, within the respective at least one window, of respective pixels associated with the respective pixel values, and determining the at least one centroid based on the at least one respective sum of weighted respective pixel values.

6. The method of claim 1 wherein determining the new value for the target pixel comprises:
   determining an adjusted line width distribution based on one of the determined at least one original width, centroid and width change;
   integrating the adjusted line width distribution over a region of the target pixel;
   using a value resulting from the integration as the new value for the target pixel if the value resulting from the integration is non-negative; and
   using a background value of the target pixel as the new value of the target pixel if the value resulting from the integration is negative.

7. The method of claims 6 wherein in integrating the adjusted line width distribution over a region of the target pixel, denoted as $p_0'$, comprises:
   calculating the new value for the target pixel using one of the equations $$p_0'=255(1+\text{MIN}[0,m_1+k]-\text{MAX}[0, m_1-k])$$

and $$p_0'=255(1+\text{MIN}[0,m_1+k]+\text{MIN}[0,k-m_1])$$

wherein $k=\frac{1}{2}(m_0+\delta-1)$, $m_0$ represents the original width, $m_1$ represents the centroid and $\delta$ represents the width change.

8. The method of claim 1 wherein determining the at least one original width of the image object comprises:
   applying a plurality of respective vector windows to respective lines of pixels centered on the target pixel; and
   for each respective vector window:
      determining a respective window width value for the image object based on respective values of respective pixels in the respective vector window, thereby generating a plurality of window width values.

9. The method of claim 8 wherein determining the at least one original width of the image object comprises:
   determining a least respective window width value of the respective plurality of window width values; and using the least respective value as the at least one original width of the image object.

10. The method of claim 8 wherein determining the at least one original width of the image object comprises:
selecting at least two of the plurality of window width values; and
estimating the original width based on the at least two respective widow widths.

11. The method of claim 8 wherein determining the new value for the target pixel comprises:
determining an image slope associated with the image object;
selecting a subset of respective vector windows from the plurality of respective vector windows based upon the determined image slope;
determining respective blending factors for respective width changes determined based on the respective window width values, of the selected respective vector windows, based on slopes of the respective selected vector windows and the image slope;
determining a weighted sum of products of the respective blending factors and the respective width changes of the selected respective vector windows; and
using the determined weighted sum as the new value of the target pixel.

12. The method of claim 11 wherein determining the image slope comprises:
applying a two-dimensional window centered on the target pixel to an area around the target pixel;
selecting a plurality of portions of the image object from within the two-dimensional window for which centroids can be determined;
determining the respective centroids of the plurality of portions of the image object;
calculating the image slope based on the plurality of respective centroids.

13. The method of claim 12 wherein selecting a plurality of portions of the image object comprises selecting portions that are evenly spaced from each other in at least one of the two-dimensions of the window.

14. The method of claim 1 wherein each of the determinations is made by an image processing system, the image processing system comprising at least one of computer memory, a microcontroller, a microprocessor, a digital signal processor, an application specific integrated circuit and a field programmable gate array.

15. The method of claim 1 comprising:
rendering a representation of at least the portion of the image according to the determined new values of target pixels determined to be associated with the image object that is the candidate for width control, wherein rendering comprises at least one of displaying and printing.

16. A method for adjusting an image that includes text or a line, the method comprising:
identifying line portions associated with text or a line of the image;
modeling one-dimensional density distributions of the identified line portions as rectangles;
determining distribution parameters of the one-dimensional models;
adjusting at least one distribution parameter of the one-dimensional models according to a desired effect;
area sampling the models of the rectangles based on the adjusted distribution parameters; and
adjusting pixel values of the image according to the area sampling.

17. The method of claim 16 wherein identifying line portions associated with text or a line of the image comprises at least one of:
counting a number of pixels within a 2 dimensional window around a target pixel that have values within a predetermined range and comparing that count to a threshold, wherein the identification of line portions associated with the text or line is made based on the result of the comparison to the threshold, determining at least one respective range of values of respective pixels within at least one respective window around the target pixel and comparing the at least one determined range to a range threshold, wherein the identification of line portions associated with the text or line is made based on the result of the comparison to the range threshold, determining if values of pixels in at least one respective window around the target pixel include at least one respective single peak, wherein the identification of line portions associated with the text or line is made based on the result of the determination regarding the inclusion of the at least one respective single peak, determining at least one respective variance of pixel values within the at least one window and comparing the at least one respective variance to a variance threshold, wherein a relatively low variance compared to the variance threshold is indicative of the identification of line portions associated with the text or line, and comparing respective values of respective pixels at edges of the at least one respective window to each other and to respective values of pixels in a respective at least one central portion of the at least one respective window and searching for a respective sign change in differences between respective values of respective neighboring pixels, wherein the identification of line portions associated with the text or line is made based on the result of the search for the sign change.

18. The method of claim 16 wherein modeling one-dimensional density distributions of the identified line portions comprises:
modeling the identified line portion according to Gaskill's rect function.

19. The method of claim of claim 16 wherein adjusting distribution parameters comprises:
adjusting at least one of a height, width, and background value.

20. The method of claim 16 wherein area sampling and adjusting pixel values comprises:
integrating an adjusted line width distribution over a region of the target pixel;
using a value resulting from the integration as the new value for the target pixel if the value resulting from the integration is non-negative; and
using a background value of the target pixel as the new value of the target pixel if the value resulting from the integration is negative.

21. The method of claims 20 wherein integrating the adjusted line width distribution over a region of the target pixel, denoted $p_0'$, comprises:
calculating the new value for the target pixel using one of the $$p_0'=255(1+\text{MIN}[0,m_1+k]-\text{MAX}[0, m_1-k])$$

and $$p_0'=255(1+\text{MIN}[0,m_1+k]+\text{MIN}[0,k-m_1]),$$

wherein $k=\frac{1}{2}(m_0+\delta-1)$, $m_0$ represents the original width, $m_1$ represents the centroid and $\delta$ represents a width adjustment.

22. The method of claim 16 wherein the identifying line portions, modeling one-dimensional density distributions, determining distribution parameters, adjusting at least one distribution parameter, area sampling and adjusting pixel values is performed by an image processing system.

23. The method of claim 16 comprising:
printing the image according to the adjusted pixel values.

24. An image processing system that is operative to adjust an image that includes text or a line, the system comprising:
a line portion identifier that is operative to identify portions of an image that are associated with text or a line;
a line width modeler that is operative to model one-dimensional density distributions of the identified line portions as rectangles and determine distribution parameters of the one-dimensional models; and
a line width adjuster that is operative to adjust at least one distribution parameter of the one-dimensional models according to a desired effect, area sample the models based on the adjusted distribution parameters and adjust pixel values of the image according to the area sampling.

25. The system of claim 24 wherein the line portion identifier is operative to identify portions of an image that are associated with text or a line by at least one of counting a number of pixels within a 2 dimensional window around a target pixel that have values within a predetermined range and comparing that count to a threshold wherein the identification of line portions associated with the text or line is made based on the result of the comparison to the threshold, determining at least one respective range of values of respective pixels within at least one respective window around the target pixel and comparing the at least one determined range to a range threshold, wherein the identification of line portions associated with the text or line is made based on the result of the comparison to the range threshold, determining if values of pixels in at least one respective window around the target pixel include at least one respective single peak, wherein the identification of line portions associated with the text or line is made based on the result of the determination regarding the inclusion of the at least one respective single peak, determining at least one respective variance of pixel values within the at least one window and comparing the at least one respective variance to a variance threshold, wherein a relatively low variance compared to the variance threshold is indicative of the identification of line portions associated with the text or line, comparing respective values of respective pixels at edges of the at least one respective window to each other and to respective values of pixels in a respective at least one central portion of the at least one respective window and searching for a respective sign change in differences between respective values of respective neighboring pixels, wherein the identification of line portions associated with the text or line is made based on the result of the search for the sign change.

26. The system of claim 24 wherein the line width modeler is operative to model one-dimensional density distributions of the identified line portions by modeling the identified line portions according to Gaskill's rect function.

27. The system of claim 24 wherein the line width adjuster is operative to perform area sampling and adjusting pixel values by integrating an adjusted line width distribution over a region of the target pixel, using a value resulting from the integration as the new value for the target pixel if the value resulting from the integration is non-negative, and using a background value of the target pixel as the new value of the target pixel if the value resulting from the integration is negative.

28. The system of claims 27 wherein the line width adjuster is operative to integrate the adjusted line width distribution over a region of the target pixel, denoted as $p_0'$, by calculating the new value for the target pixel using one of the equations $$p_0'=255(1+\text{MIN}[0,m_1+k]-\text{MAX}[0, m_1-k])$$

and $$p_0'=255(1+\text{MIN}[0,m_1+k]+\text{MIN}[0,k-m_1]),$$

wherein $k=\frac{1}{2}(m_0+\delta-1)$, $m_0$ represents an original width, $m_1$ represents the centroid and $\delta$ represents a width adjustment.

* * * * *